March 20, 1945.                H. P. FARIS ET AL                    2,371,747
                                CONVEYER STRUCTURE
                              Filed April 24, 1943
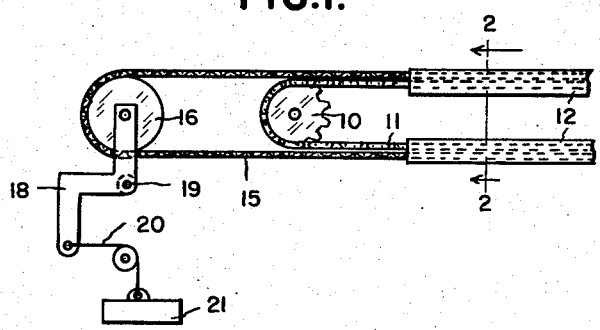
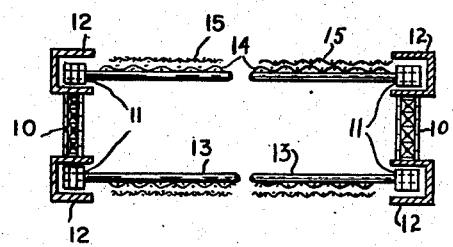
INVENTORS
HAROLD P. FARIS
BY  JOHN E. WHITE
ATTORNEYS Patented Mar. 20, 1945

2,371,747

UNITED STATES PATENT OFFICE 2,371,747

CONVEYER STRUCTURE

Harold P. Faris, Philadelphia, Pa., and John E. White, Trenton, N. J., assignors to National Automotive Fibres, Inc., Detroit, Mich., a corporation of Delaware Application April 24, 1943, Serial No. 484,434

4 Claims. (Cl. 18—6)

This invention relates generally to carpet making machines for manufacturing carpet of the cemented pile type and constitutes a division of our application, filed October 28, 1940, bearing Serial No. 363,196.

One of the essential objects of the invention is to provide an improved conveyer structure for advancing through a suitable vulcanizing chamber carpet material such as burlap covered rubber provided upon the upper surface of the burlap with freshly cemented cut fibers, such as cut hair, so that (1) the cement or adhesive substance employed to anchor the fibers upon the burlap will harden and set to hold the fibers in the form of a pile simulating the pile of conventional woven carpet, and (2) the rubber of the carpet material will blow and be vulcanized.

Another object is to provide a conveyer structure that is foraminous in nature to permit the warm air in the vulcanizing chamber to pass through the conveyer to the underside of the rubber of the carpet material, and to function as a mold for transforming the underside of the rubber into a configuration conforming to the configuration of the conveyer upon which the rubber rests while being advanced through the vulcanizing chamber so that the underside of the rubber when vulcanized will have a non-skid surface for engagement with a floor or other surface upon which the finished cemented pile carpet is placed when in use. Preferably the conveyer structure has a coarse screen supported by transverse rods terminally connected to drive chains which are engageable with spaced supporting guides. Over the coarse supporting screen is provided a relatively fine mesh screen which is uniformly tensioned and preferably formed of interwoven helically coiled wires so that flexing of such screen is possible without deformation of the elements thereof.

Another object is to provide a conveyer structure wherein the rods, chains and supporting guides cooperate with each other to prevent the screens from sagging.

Another object is to provide a conveyer structure that is simple in construction, economical to manufacture, easy to install and efficient in operation.

Other objects, advantages and novel details of construction of this invention will be made more apparent as this description proceeds, especially when considered in connection with the accompanying drawing, wherein:

Figure 1 is a fragmentary elevational view of a conveyer structure for advancing freshly cemented pile carpet through a vulcanizing chamber;

Figure 2 is a fragmentary sectional view taken substantially on the line 2—2 of Figure 1.

After cut fibers such as cut hair have been imbedded in a cement or adhesive coating applied to the upper surface of carpet material such as burlap covered blowing rubber, as in our original application filed October 28, 1940, bearing Serial No. 363,196, the freshly cemented pile carpet with the rubber thereof lowermost is advanced by the conveyer structure illustrated in Figures 1 and 2 herein through a heating and vulcanizing chamber (not shown). Such chamber may be more or less conventional in construction, and preferably heat will be supplied thereto in the form of hot air, carefully controlled as to temperature so as to cause the blowing rubber stock to first blow to sponge rubber and then to be vulcanized.

It is important that the conveyer structure employed in the manufacture of this carpet shall be arranged so as to feed the carpet material through a substantially straight-line relation. Of course, it is permissible to change the direction of advance of the material slightly, but in no case is it desirable to arrange the material in festoons, or to pass the same around rolls having a small radius of curvature.

Accordingly, the heating and vulcanizing chamber (not shown) is preferably arranged in a horizontal position and the material is fed horizontally through the chamber in a straight-line direction. Since the heat is applied to the material in the form of hot air it is, of course, desirable to support the material on a pervious support so as to provide ready access for the hot air to the underside of the sponge rubber stock.

It may be stated at this time that the blowing of the rubber stock as it passes through the vulcanizing chamber is substantially unrestricted since any tension in the carpet material is ineffective to prevent expansion of the rubber. It will also be apparent that as the blowing rubber stock blows and vulcanizes, it will acquire a bottom configuration in accordance with the configuration of the conveyer belt upon which the sponge rubber stock rests.

We have found that a desirable under surface for the carpet is imparted where the material is advanced through the vulcanizing chamber on a wire screen of relatively fine mesh. In practice, we employ a screen formed of parallel, helical convolutions of wire which are interlocked with each other. Screens of this type are on the market and we make no claim to the screen per se.

It is noted, however, that screens of this type are particularly adapted for the present purpose since they pass around conveyer rolls without flexing the wire elements. Furthermore, a screen of this type forms a desirable roughened pattern on the lower surface of the sponge rubber in the completed product.

In Figures 1 and 2 we have indicated a structure which we employ for supporting the screens during their passage through a vulcanizing chamber. Figures 1 and 2 are more or less diagrammatic but well illustrate the construction employed.

As shown, sprockets 10 carry chains 11 which serve to drive the supporting screen structure. Located between the sprockets 10 are longitudinally extending parallel inwardly opening channel members 12 in which the chains 11 are received and are adapted to travel. Rods 13 extend between and are terminally connected to the chains 11. Such rods cooperate with the chains 11 and channel members 12 to prevent the screens from sagging.

One screen 14, which may be relatively strong and of relatively coarse mesh, is carried by the rods 13 and may if desired be tied thereto at appropriate intervals.

Suitable means (not shown) are provided for varying the spacing of the sprockets 10 relative to opposite ends of the channel members 12. Conveniently such means may take the form of compression springs urging the sprockets apart so as to maintain a substantially constant tension on the chains 11.

The screen 15 of relatively fine mesh for supporting engagement with rubber of the carpet material is reeved on rolls 16 which are slightly larger in diameter than and are spaced outwardly from the sprockets 10 so that the screen 15 will travel upon and be supported by the screen 14.

The drive means (not shown) for the screens rotate the sprockets 10 and the rolls 16 at selected speeds so that there is no relative slippage between the screen 15 and the supporting screen 14. If desired, the frictional contact between the screens 14 and 15 may be such that the screen 15 may be driven by the screen 14, in which event the drive for the rolls 16 may be dispensed with entirely and a single drive means for one of the sprockets 10 will suffice.

To tension the screen 15, one of the rolls 16 is carried by a bell crank 18 pivoted as indicated at 19 and connected by means of a cable 20 with a weight 21.

What we claim as our invention is:

1. An elongated conveyer structure having laterally spaced pairs of substantially horizontal inwardly opening channel shaped supporting rails, the rails of each pair being spaced vertically apart, rotatable elements arranged in tandem beyond opposite ends of said rails, the rotatable elements nearest the ends of said rails being smaller than the rotatable elements farthest from said rails, an endless conveyer reeved on said smaller rotatable elements nearest said rails and movable within the channels of said rails to be guided thereby, said conveyer forming an elongated closed loop, and an endless conveyer upon the outside of the first mentioned conveyer and reeved on the rotatable elements farthest from said rails, the last mentioned conveyer forming an elongated closed loop of greater length than the closed loop of the first mentioned conveyer and being movable lengthwise of said rails but supported by and in frictional engagement with the first mentioned conveyer, the frictional engagement between said conveyers being such that both may be actuated in unison by drive means for one of them.

2. An elongated conveyer structure having a pair of longitudinally spaced rolls, longitudinally spaced pairs of sprockets between said longitudinally spaced rolls, the sprockets of each pair being spaced laterally apart, two endless conveyers constituting elongated closed loops and disposed one inside the other, the innermost of said endless conveyers having laterally spaced endless chains mounted upon said sprockets, rods extending between and terminally connected to said laterally spaced chains, and an endless screen of relatively coarse mesh upon the outer side of and carried by said rods, the outermost of said conveyers having an endless screen of relatively fine mesh constituting a supporting mold for the underside of rubberous material to be vulcanized, said endless screen of fine mesh being reeved upon said rolls and disposed in frictional contact with and supported in part by the endless screen of the innermost conveyer, and tracks for the upper and lower flights of the chains of the innermost of said conveyers located between said longitudinally spaced sprockets and constituting common supports for both conveyers during movement thereof.

3. An elongated conveyer structure having laterally spaced pairs of substantially horizontal supporting rails, the rails of each pair being spaced vertically apart, rotatable elements arranged in tandem beyond opposite ends of said rails, the rotatable elements nearest the ends of said rails being sprockets, an endless conveyer reeved on said sprockets and movable longitudinally of and supported by said rails, said conveyer forming an elongated closed loop, the rotatable elements farthest from the ends of said rails being rolls, and an endless conveyer upon the outside of the first mentioned conveyer and reeved on said rolls, the last mentioned conveyer forming an elongated closed loop of greater length than the closed loop of the first mentioned conveyer and being movable lengthwise of said rails but supported by and in frictional engagement with the first mentioned conveyer, the frictional engagement between said conveyers being such that both may be actuated in unison by drive means for one of them.

4. An elongated conveyer structure having a pair of longitudinally spaced rolls, longitudinally spaced pairs of sprockets between said longitudinally spaced rolls, the sprockets of each pair being spaced laterally apart, two endless conveyers constituting elongated closed loops and disposed one inside the other, the innermost of said endless conveyers having laterally spaced endless chains mounted upon said sprockets, the outermost of said conveyers being reeved upon said rolls and having an endless screen constituting a supporting mold for the underside of rubberous material to be vulcanized and supported in part by the innermost of said conveyers, and tracks for the upper and lower flights of the chains of the innermost of said conveyers located between said longitudinally spaced sprockets and constituting supporting guides for said innermost conveyer.

HAROLD P. FARIS.
JOHN E. WHITE.